W. F. SCHACHT.
VALVE DISK.
APPLICATION FILED FEB. 3, 1915.
1,171,664.
Patented Feb. 15, 1916.
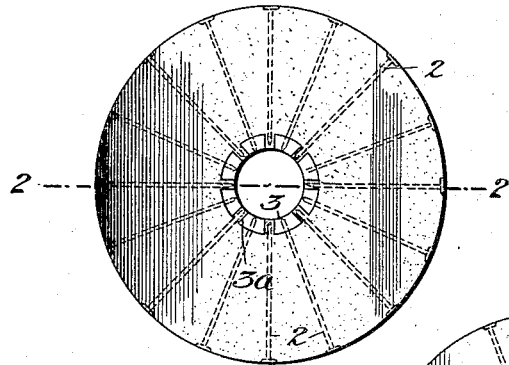
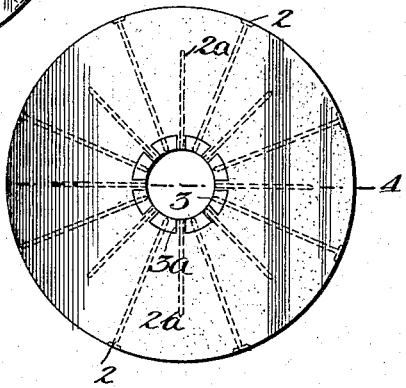
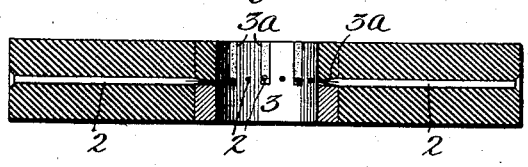
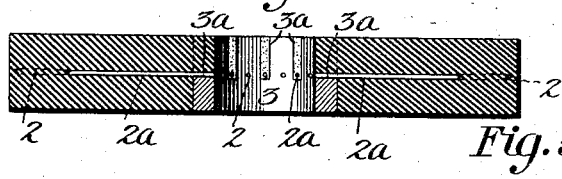
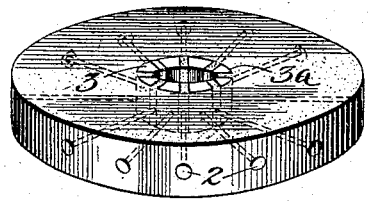
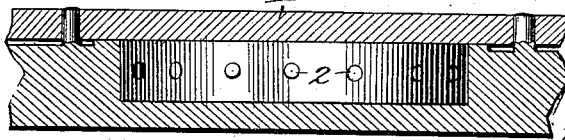
Inventor
William F. Schacht
Witnesses
Philip E. Barnes
W. Wallace Nairn Jr.
By
Dowell & Dowell
his Attorneys

UNITED STATES PATENT OFFICE.

WILLIAM F. SCHACHT, OF HUNTINGTON, INDIANA.

VALVE-DISK.

1,171,664.  Specification of Letters Patent.  Patented Feb. 15, 1916.

Application filed February 3, 1915. Serial No. 5,930.

*To all whom it may concern:*

Be it known that I, WILLIAM F. SCHACHT, a citizen of the United States, residing at Huntington, in the county of Huntington and State of Indiana, have invented certain new and useful Improvements in Valve-Disks; and I hereby declare that the following is a full, clear, and exact description thereof, reference being had to the accompanying drawings, which form part of this specification.

This invention is a novel valve-disk for use in mine pumps and the like, for pumping either hot or cold water or other fluids.

The object of my invention is to provide a rubber or composition valve disk reinforced with metal in such manner that it will be very strong, durable, and greatly superior to the present known types of such valve disks, and also very simple and economical to manufacture.

Heretofore such valve-disks have been made from rubber or composition, and owing to the great pressure to which they are subjected in use they rapidly disintegrate and break, and frequently portions of such broken valve-disks have been forced into or through the valve seats or fluid passages, and the pump or apparatus thereby rendered ineffective or useless. It has been heretofore attempted to reinforce such valve-disks by embedding metal disks or coils of wire therein. In order to reinforce the valve-disks special molds and dies are required; and such reinforced disks are usually made by placing the metal reinforce between two pieces of composition, then the whole is subjected to pressure and heat so as to unite the two pieces of composition and embed the metal reinforce therebetween. This method of manufacture is expensive and the resulting valve-disks are not truly homogeneous.

By my present invention metal-reinforced valve-disks can be made practically as cheaply as the ordinary composition valve-disks, and in the ordinary valve-disk molds or dies, and out of a unitary piece of rubber or composition; and my invention includes both the novel reinforced valve-disks and the novel method of making them.

In said drawings: Figure 1 is a plan view of a reinforced valve-disk embodying the invention the metal reinforce being indicated in dotted lines. Fig. 2 is an enlarged section on the line 2—2, Fig. 1. Fig. 3 is a detail view of a slight modification of the valve-disk. Fig. 4 is a section on line 4—4, Fig. 3. Fig. 5 is a view of a blank prior to compression, with metal reinforces inserted therein. Fig. 6 is a sectional view of the reinforced valve-disk within a mold.

In carrying out my invention I preferably form out of a suitable material, such as non-vulcanized rubber or a composition thereof, a blank (Fig. 5) approximately conforming in shape to the valve-disk to be produced; and then into this blank are inserted or forced a series of independent metal reinforcing members 2, which may be of short lengths of wire or metal rods of any suitable cross section. I preferably use wire nails. These reinforcing members are preferably arranged radially, and are located in approximately the central plane of the blank as indicated in Figs. 2 and 4. Said reinforcing members can be inserted or forced into the blank from the outer periphery thereof, and preferably are disposed radially of the blank. In some cases the valve-disks may be provided with axial metallic rings, or hubs 3, which are preferably made of brass, and such hubs may be provided with apertures or notches 3ª with which the inner ends of the radial reinforcing members 2 can be engaged, as indicated.

In some cases reinforcing members may be inserted into the blank through the slots or notches 3ª in the hubs, as indicated at 2ª. After the reinforcing members are properly inserted into the blank the latter may be placed in a suitable mold as at M, and compressed as indicated in Fig. 6, thus giving it the desired final and finished form, and while so compressed the blank can be dried or vulcanized by heat in the usual manner so that when removed from the mold the reinforced valve-disk, shown as in Figs. 1 and 2, is produced; such valve-disk having a homogeneous body of rubber or composition reinforced by a series of independent preferably radially disposed metallic members, and if desired also having a metallic hub or core.

It will be observed that by the novel method of manufacturing reinforced valve-disks the latter remain homogeneous, as the reinforcing members are inserted or forced into the blank after it is formed; and it is not necessary to use special dies, or complicated molds as has been necessary in the manufacture of the heretofore known reinforced valve-disks; as my reinforced valve-disks can be made with the ordinary molds heretofore used in making ordinary non-reinforced valve-disks.

What I claim is:

1. The herein described process of manufacturing reinforced composition valve disks and the like, consisting in forming a blank of suitable material, then inserting into said blank a series of independent reinforcing rods or nails, and finally shaping and vulcanizing the blank.

2. The herein described method of producing metal reinforced rubber valve disks, consisting in forming a blank out of a piece of rubber composition, inserting into said blank a series of independent radially disposed reinforcing wires or nails, then placing such reinforced blank in a mold to shape same and vulcanizing such reinforced blank.

3. The herein described reinforced valve disk consisting of a composition body having a series of independent radially disposed reinforcing wires or nails embedded therein, substantially as described.

4. The herein described reinforced valve disk comprising a vulcanized disk of rubber composition, and a series of independent radially disposed reinforcing nails or wires embedded in said disk, substantially as described.

In testimony that I claim the foregoing as my own, I affix my signature in presence of two witnesses.

WILLIAM F. SCHACHT.

Witnesses:
M. J. KROGEN,
M. K. BAKER.

Copies of this patent may be obtained for five cents each, by addressing the "Commissioner of Patents, Washington, D. C."